(12) United States Patent
Forsberg et al.

(10) Patent No.: US 11,591,980 B2
(45) Date of Patent: Feb. 28, 2023

(54) METHOD FOR CONTROLLING THE BRAKING OF A VEHICLE COMPRISING A DIESEL ENGINE

(71) Applicant: VOLVO TRUCK CORPORATION, Gothenburg (SE)

(72) Inventors: Mikael Forsberg, Gothenburg (SE); Anders Eriksson, Torslanda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/416,279

(22) PCT Filed: Dec. 20, 2018

(86) PCT No.: PCT/EP2018/086340
§ 371 (c)(1),
(2) Date: Jun. 18, 2021

(87) PCT Pub. No.: WO2020/126010
PCT Pub. Date: Jun. 25, 2020

(65) Prior Publication Data
US 2022/0074363 A1  Mar. 10, 2022

(51) Int. Cl.
*B60W 10/184* (2012.01)
*F02D 41/02* (2006.01)
(Continued)

(52) U.S. Cl.
CPC .......... *F02D 41/024* (2013.01); *B60W 10/06* (2013.01); *B60W 10/11* (2013.01);
(Continued)

(58) Field of Classification Search
CPC .............. B60W 10/11; B60W 10/184; B60W 30/18109; B60W 2510/0638;
(Continued)

(56) References Cited

U.S. PATENT DOCUMENTS 8,849,550 B2 * 9/2014 Larsson ................. F02D 13/04
                                                    701/112
9,303,576 B2 * 4/2016 Hashemi ............. F02D 41/0295
(Continued)

FOREIGN PATENT DOCUMENTS

DE      10348107 A1    5/2005
EP       3346116 A1    7/2018
(Continued)

OTHER PUBLICATIONS

International Search Report and Written Opinion dated Sep. 17, 2019 in corresponding International PCT Application No. PCT/EP2018/086340, 9 pages.

*Primary Examiner* — Roger L Pang
(74) *Attorney, Agent, or Firm* — Venable LLP; Jeffri A. Kaminski

(57) ABSTRACT

The invention relates to a method for controlling braking of a vehicle (1), comprising a diesel engine (100) and an exhaust after treatment (EAT) system (200) for treating exhaust from said diesel engine (100), a set of ground engaging members (300), and a transmission (400) between said set of ground engaging members (300) and said diesel engine (100). The method comprises: —In response to a determined present engine speed being equal to or less than a current engine braking minimum limit speed: changing the gear ratio of said transmission (400) such that an updated engine speed is obtained, whereby a determined present engine speed is above said current engine braking minimum limit speed (S60), and—In response to the determined present engine speed being above said current engine braking minimum limit speed: engine braking so as to decrease said present engine speed (S70). The invention also relates to a computer program, a computer readable medium, a control unit, and a vehicle comprising a control unit.

18 Claims, 5 Drawing Sheets

(51) Int. Cl.
*B60W 10/06* (2006.01)
*B60W 10/11* (2012.01)
*B60W 10/198* (2012.01)
*B60W 30/18* (2012.01)

(52) U.S. Cl.
CPC ........ *B60W 10/184* (2013.01); *B60W 10/198* (2013.01); *B60W 30/18109* (2013.01); *B60W 30/18136* (2013.01); *B60W 2510/0638* (2013.01); *B60W 2710/06* (2013.01); *B60W 2710/0694* (2013.01); *B60W 2710/1005* (2013.01); *B60W 2710/18* (2013.01); *F02D 2200/101* (2013.01)

(58) Field of Classification Search
CPC ..... B60W 2710/1005; B60W 2710/18; B60W 10/06; B60W 10/198; B60W 30/18136; B60W 2710/0694; B60W 2710/06; F02D 41/024

USPC ........................................................ 477/110
See application file for complete search history.

(56) References Cited

U.S. PATENT DOCUMENTS

| | | | |
|---|---|---|---|
| 10,576,978 B2 * | 3/2020 | Borhan | ................... F02D 29/02 |
| 11,187,178 B1 * | 11/2021 | Bieniek | ................... F02D 23/00 |
| 2002/0052266 A1 * | 5/2002 | Suzuki | ................... B60K 6/445 |
| | | | 477/102 |
| 2008/0196388 A1 | 8/2008 | Johnson et al. | |
| 2015/0233314 A1 * | 8/2015 | Stenlaas | .............. B60W 30/188 |
| | | | 701/51 |

FOREIGN PATENT DOCUMENTS

| | | |
|---|---|---|
| WO | 2010110700 A1 | 9/2010 |
| WO | 2017127219 A1 | 7/2017 |

* cited by examiner

METHOD FOR CONTROLLING THE BRAKING OF A VEHICLE COMPRISING A DIESEL ENGINE

CROSS-REFERENCE TO RELATED APPLICATIONS

This application is a U.S. National Stage application of PCT/EP2018/086340, filed Dec. 20, 2018, and published on Jun. 25, 2020, as WO 2020/126010 A1, all of which is hereby incorporated by reference in its entirety.

TECHNICAL FIELD

The invention relates to a method for controlling braking of a vehicle, comprising a diesel engine and an exhaust aftertreatment (EAT) system for treating exhaust from said diesel engine, a set of ground engaging members, and a transmission between said set of ground engaging members and said diesel engine. The invention also relates to a computer program, a computer readable medium, a control unit, and a vehicle.

The invention can be applied in heavy-duty vehicles, such as trucks, buses and construction equipment. Although the invention will be described with respect to a truck, the invention is not restricted to this particular vehicle, but may also be used in other vehicles such as a bus.

BACKGROUND

Vehicles comprising diesel engines conventionally comprise an exhaust aftertreatment (EAT) system for treating exhaust from the engine in order to reduce pollutants, in particular pollutants such as particles (including soot) and nitrogen oxides (NOx).

To this end, the exhaust aftertreatment system may comprise a number of different exhaust aftertreatment devices. Such devices may be a Diesel Oxidation Catalyst (DOC), a Diesel Particulate Filter (DPF), Urea or other reductant injection, a Selective Catalyst Reduction (SCR) catalyst, and/or an Ammonia Slip Catalyst (ASC). An exhaust aftertreatment device generally displays a preferred working temperature range within which the function of the aftertreatment device is sufficiently efficient.

However, during certain operating conditions of the engine, the temperature of the exhaust gases may be relatively low, meaning that the preferred working temperature range of one or more of the exhaust aftertreatment devices is not reached. Such operating conditions may in particular be low load situations and/or stop and go situations.

To overcome the problem with low exhaust gas temperatures during certain operating conditions, it has been proposed to warm the EAT system.

To determine the need for heating the EAT system, one or more sensors, e.g. temperature sensors may be arranged. Information from the sensors may be used to determine whether a need for heating the EAT system is present or not, and to form a request for heating the EAT system or not.

The heating of the EAT system may be performed in various manners. For example, an electric heater may be arranged adjacent the EAT system. However, it has also been proposed to increase the temperature in the EAT system by controlling the diesel engine cylinders.

EP 3 346 116 discloses a method to increase the temperature in the EAT system by partitioning the combustion engine cylinders into two subsets, where a first subset is active or fired, while the second subset is operated according to an engine brake operation. The method is used in response to a request to warm up an EAT system.

WO2017/127219 also relates to providing an engine wherein cylinders are selectively deactivated and reactivated while other cylinders selectively engine brake to manage thermal aspects.

Accordingly, it is known to heat the EAT system while engine braking, meaning that a braking situation for the vehicle may be used for accomplishing said heating. However, the use of engine braking is conventionally restricted. For example, engine braking is generally disabled for reasons of low comfort and/or risk of stalling the engine during certain operating conditions.

In view of the above, there is a need for an alternative method for braking a vehicle, which enables heating of the EAT system when requested.

SUMMARY

An object of the invention is to provide a method enabling the braking of a vehicle, comprising a diesel engine and an exhaust aftertreatment (EAT) system for treating exhaust from said diesel engine, while providing for heating of said EAT system when required.

The object is achieved by a method according to claim 1.

As such, the method is a method for controlling braking of a vehicle comprising a diesel engine and an exhaust aftertreatment (EAT) system for treating exhaust from said diesel engine, a set of ground engaging members, and a transmission between said set of ground engaging members and said diesel engine.

The method comprises the steps of:

Receiving a speed reduction request;

Receiving a request indicative of whether there is a need for heating said EAT system or not;

Determining that said request is indicative of that there is a need for heating said EAT system and controlling said braking of said vehicle until said speed reduction request and/or said request indicative of a need for heating said EAT system is no longer applicable in accordance with the following:

In response to a determined present engine speed being equal to or less than a current engine braking minimum limit speed: changing the gear ratio of said transmission such that an updated present engine speed is obtained, whereby a determined present engine speed is above said current engine braking minimum limit speed, and In response to a determined present engine speed being above said current engine braking minimum limit speed: engine braking so as to decrease said present engine speed.

Optionally, the method further comprises

Determining a present engine speed so as to obtain said determined present engine speed; and Comparing said present engine speed with a current engine braking minimum limit speed.

The term "engine braking" is herein understood to encompass exhaust braking and/or compression braking. Exhaust braking and compression braking may be applied one by one or in any combination.

Exhaust braking generally involves restricting the passage of exhaust gases from the engine, causing the exhaust gases to be compressed in the exhaust manifold and in the cylinder, resulting in the slowing down of the vehicle.

Compression braking generally involves opening exhaust valves in the cylinders of the diesel engine after the compression cycle, so as to release the gas compressed in the cylinders, resulting in the slowing down of the vehicle.

It is to be understood, that if exhaust braking and compression braking would not be sufficient to fulfil the speed reduction request, for example if very fast deceleration of the vehicle is required, friction braking (wheel braking) may be performed simultaneously with the exhaust braking and compression braking.

However, it is preferred that whenever possible in order to fulfil the speed reduction request, engine braking (exhaust braking and/or compression braking) only is performed in order to minimize service brake wear.

Generally, the braking power from engine braking is the result of a brake blending between exhaust braking and compression braking. Exhaust braking is preferred over compression braking. Exhaust braking provides more heat to the EAT system at a relatively low engine braking power, as compared to compression braking. Also, exhaust braking provides a relatively low braking power, as compared to compression braking. This is useful in the method as described herein where it may often be desired to heat the EAT system over a period of time.

Hence, the method may for example comprise an initial step of using exhaust braking only. If the braking power from exhaust braking reaches its maximum before the request for speed reduction is met, the method may comprise a continued step of adding compression braking to the exhaust braking. In this step, it may be necessary to reduce the power from the exhaust braking, to enable said compression braking without problems resulting from a high backpressure towards the engine (resulting from the exhaust braking).

Optionally, the engine braking may at least comprise compression braking.

The need for heating said EAT system may be a need for heating one or more of the exhaust aftertreatment device(s) of the EAT system. As mentioned in the above, an EAT system may typically comprise devices such as a Diesel Oxidation Catalyst (DOC), a Diesel Particulate Filter (DPF), Urea (or other reductant) injection, a Selective Catalyst Reduction (SCR) catalyst, and/or an Ammonia Slip Catalyst (ASC). The need for heating the EAT system may be a need for increasing the temperature of one or more devices in the EAT system, and/or a need for maintaining the temperature of one or more devices in the EAT system.

In accordance with the method, heating of the EAT system is achieved while simultaneously engine braking so as to accomplish to a speed reduction request. The engine braking is applied when the present engine speed is above a current engine braking minimum limit speed. However, if the present engine speed is equal to or less than the current engine braking minimum limit speed, the method involves changing the gear ratio of the transmission such that an increase of the present engine speed to a value above the current engine braking minimum limit speed is obtained.

As a result of the changing of gear ratio, engine braking may be continued until the request for heating the EAT system and/or the speed reduction request is not applicable.

The current engine braking minimum limit speed may be set so as to ensure that the engine does not stall at decoupling of the engine braking. As such, the engine braking minimum limit speed may be an empirical value, determined by studying the response time of the engine system from releasing the engine braking until the engine speed falls to idle speed.

The current engine braking minimum limit may vary depending on whether the engine braking comprises exhaust braking and/or compression braking. Generally, the engine braking minimum limit speed for compression braking may be higher than the engine braking minimum limit speed for exhaust braking.

The current engine braking minimum limit to use when performing the method may hence be a constant value, set so as to be the higher one out of the engine braking minimum limit speed of the compression braking and the exhaust braking.

However, preferably, the method may comprise selecting the value of the current engine braking minimum limit depending on the current engine braking performed. I.e. if only exhaust braking is applied, then the current engine braking minimum limit speed may be the engine braking minimum limit speed of exhaust braking. If however also compression braking, or compression braking only, is applied, then the current engine braking minimum limit speed may be the compression braking minimum limit speed.

As an example, the engine braking minimum limit speed of the compression braking may be about 900 rpm, whereas the engine braking minimum limit speed of the exhaust braking may be about 800 rpm.

Optionally, the current engine braking minimum limit speed may be a fixed value, i.e. a constant determined for the diesel engine and/or vehicle in question. For example, the current engine braking minimum limit speed value may be in the range of 700-900 rpm.

Optionally, the current engine braking minimum limit speed may be a value which is determined based on current engine braking conditions.

Optionally, the method may comprise a step of determining a current minimum engine speed.

Optionally, the method may comprise a step of retrieving a current minimum engine speed.

Optionally, the method further comprises the steps of:

Determining that the present engine speed is above said current engine braking minimum limit speed and engine braking so as to decrease said present engine speed until it reaches said current engine braking minimum limit.

Optionally, the method further comprises the step of determining that the present engine speed is less than a predetermined limit speed before starting said controlling of said braking of said vehicle. The predetermined limit speed may be an engine speed value being set such that the method is enabled in situations where the engine speed risks decreasing to the current engine braking minimum limit speed. For example, the predetermined limit speed may be equal to a lower limit of a defined optimal cruising engine speed range. The optimal cruising engine speed range may correspond to an optimal fuel consumption range of the engine, which is often between about 1000 to 1400 rpm. The gear ratio is generally selected such that, during driving of the vehicle at normal highway speed, the highest gear available results in the engine speed falling within the optimal cruising engine speed range.

Optionally, the request indicative of whether there is a need for heating said EAT system or not is based on a present situation. For example, the request may be based on information from a sensor which indicates a current less than optimum function of the EATS system or a device thereof, and/or a sensor which indicates a current temperature of the EATS system, a device thereof and/or the exhaust gases.

Optionally, the request indicative of whether there is a need for heating said EAT system or not is based on an upcoming situation. The upcoming situation may optionally be predicted using data, such as traffic situation data, geographic data, weather data and/or EATS status. An upcoming situation in which there is a need for heating the EAT system could be a situation in which the engine is frequently stopped and started, such as in a traffic jam, dense city driving, or similar.

Optionally, the method may comprise the step of:
while performing said step of changing the gear ratio of said transmission, momentarily interrupting any engine braking.

Optionally, the method may comprise, in said step of changing the gear ratio of said transmission, that said gear ratio is selected in view of said speed reduction request and/or said heat request so that said step will be performed only once before the speed reduction request and/or the heat request is no longer applicable.

Optionally the method may comprise, in said step of changing the gear ratio of said transmission, that said gear ratio is selected in view of said speed reduction request and/or said heat request so that said step will be performed more than once before the speed reduction request and/or heat request is no longer applicable.

Generally, the determination whether to select said gear ratio so that the step will be performed only once or more than once before the speed reduction request and/or the heat request is no longer applicable may be made considering which option provides the desired heat to the EAT system in view of the need for decelerating the vehicle.

If the step is performed only once, the result may be a relatively higher deceleration over a relatively shorter distance. If the step is performed more than once, the result may be a relatively lower deceleration over a relatively longer distance.

Optionally, the method may comprise performing said step of changing the gear ratio between 1 and 10 times, preferably between 1 and 6 times before the speed reduction request and/or heat request is no longer applicable.

Optionally, the method may comprise performing said step of changing the gear ratio between 2 and 10 times, preferably between 2 and 6 times before the speed reduction request and/or heat request is no longer applicable.

Optionally, in said step of changing the gear ratio of said transmission, the gear ratio may be selected so as to perform an increase of the engine speed in the range of 800 to 1700 rpm, preferably 900 to 1500 rpm, most preferred 1000 to 1250 rpm.

Optionally, the method is further comprising
Determining that said request is indicative of that there is not a need for heating said EAT system, and controlling the braking of the vehicle until said speed reduction request is no longer applicable in accordance with a method comprising at least the step of:
decoupling the set of ground engaging members from said diesel engine, and, optionally, braking said set of ground engaging members.

Hence, when there is not a need for heating the EAT system, the braking may be made as is conventional, namely by decoupling the ground engaging members from the engine, and braking e.g. using friction braking.

This method of braking is performed if there is no need for heating the EAT system and in particular if the present engine speed is close to the engine speed limit for safely decoupling engine braking.

Accordingly, the method may further comprise, when determining that the request is indicative of that there is not a need for heating said EAT system;

In response to a determined present engine speed being equal to or less than a current engine braking minimum limit speed: performing said step of decoupling said set of ground engaging members from said diesel engine.

Optionally, the method may comprise the steps of:
Determining a present engine speed, and
Comparing said present engine speed with a current engine braking minimum limit speed.

In a second aspect, the invention relates to a computer program comprising program code means for performing the steps of the method as described in the above when said program is run on a computer.

In a third aspect, the invention relates to a computer readable medium carrying a computer program comprising program code means for performing the steps of the method as described in the above, when said program product is run on a computer.

In a fourth aspect, the invention relates to a control unit for controlling the braking of a vehicle, the control unit being configured to perform the steps of the method as described in the above.

In a fifth aspect, the invention relates to a vehicle comprising a control unit according to the fourth aspect, a diesel engine and an exhaust aftertreatment (EAT) system for treating exhaust from said diesel engine, a set of ground engaging members, and a transmission between said set of ground engaging members and said diesel engine.

In the examples of this application, the vehicle is generally a truck, in which case the ground engaging members are conventionally wheels. It is to be understood however that other vehicles with other types of ground engaging members are also suitable for the present invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
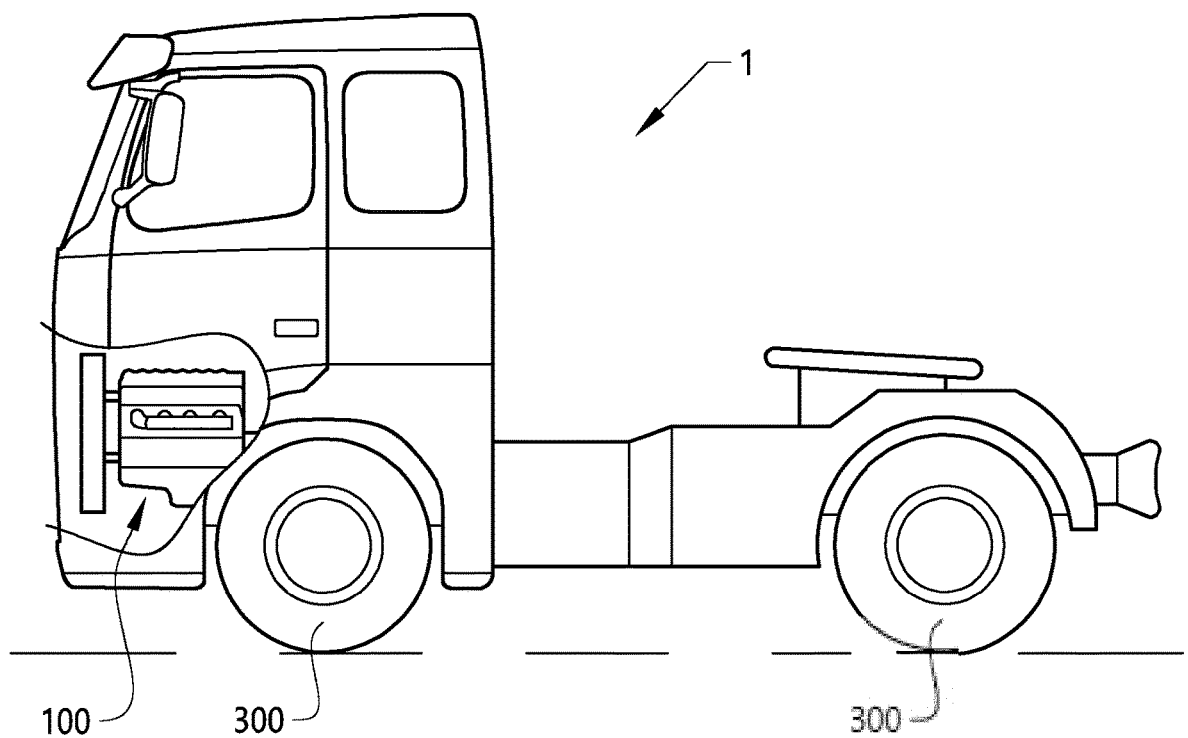
FIG. 1 shows a vehicle implementing the method as described herein.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. The skilled person will recognize that many changes and modifications may be made within the scope of the appended claims. Like reference characters refer to like elements throughout the description.

FIG. 1 schematically illustrates a vehicle in the form of a truck 1 comprising a diesel engine 100. Although not shown in FIG. 1, the vehicle further comprises an exhaust aftertreatment (EAT) system for treating exhaust from the diesel engine 100. Moreover, the vehicle 1 comprises a set of ground engaging members 300, in this embodiment being wheels. Although not shown, the vehicle 1 also comprises a transmission between the set of ground engaging members 300 and the vehicle for transmitting driving torque from the engine to the ground engaging members. The transmission may be arranged to transmit driving torque to all of the ground engaging members 300 of the vehicle 1, however it is sufficient that the transmission is arranged to transmit driving torque to one set of ground engaging members 300. Preferably, driving torque is transmitted at least to or only to the back set of ground engaging members 300.

Figure 2:
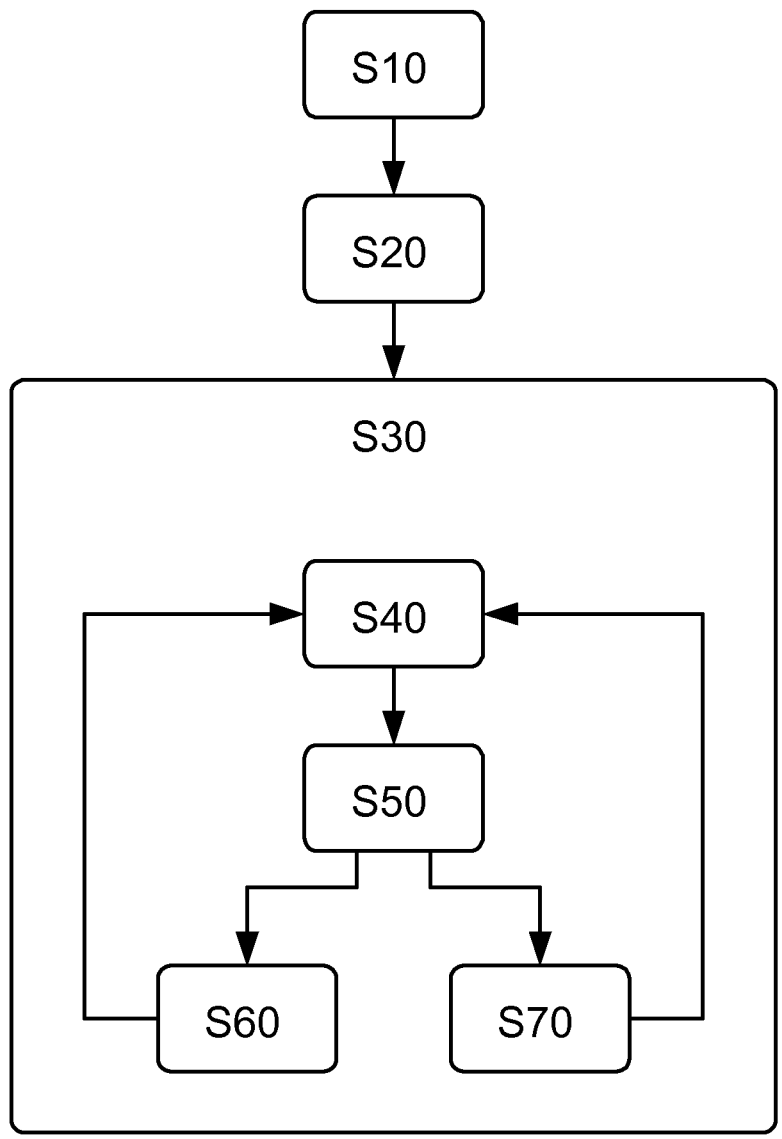
FIG. 2 is a flow-chart illustrating an embodiment of the method described herein.

FIG. 2 is a flow-chart illustrating a method for controlling the braking of a vehicle 1, for example the vehicle 1 of FIG. 1. The vehicle 1 comprises a diesel engine 100 and an exhaust aftertreatment (EAT) system 200 for treating exhaust from the diesel engine 100, a set of ground engaging members 300, and a transmission 400 between the set of ground engaging members 300 and the diesel engine 100 (See FIG. 4).

In a first step S10, the method comprises receiving a speed reduction request. Such a request may be generated manually or automatically. For example, the request may be resulting from the action of a driver pressing a brake pedal of the vehicle. Optionally, the request may result from an autonomous driving system which may react for example to incoming information related to the present or upcoming driving situation, such as surrounding traffic, speed limits, or dense traffic areas. The speed reduction request may be transmitted via any suitable signal transmission means.

In a next step S20, the method comprises receiving a request indicative of whether there is a need for heating the EAT system or not. As mentioned in the introduction, the EAT system may comprise a number of different exhaust aftertreatment devices. Such devices may be a Diesel Oxidation Catalyst (DOC), a Diesel Particulate Filter (DPF), Urea injection, a Selective Catalyst Reduction (SCR) catalyst, and/or an Ammonia Slip Catalyst (ASC). The exhaust aftertreatment devices generally display a preferred working temperature range within which the function of the aftertreatment devices is sufficiently efficient. Hence, the request indicative of whether there is a need for heating the EAT system or not may be a request indicative of the need for heating at least one component of the EAT system (or not). Such a request may be generated based on the output from at least one sensor. For example, a sensor arranged to sense the temperature of at least one of the exhaust aftertreatment devices may be used to evaluate whether there is a need for heating of the EAT system 200. Optionally, a sensor arranged to determine the function of the EAT system 200 or of at least one component thereof, for example a sensor evaluating the exhaust from the EAT system 200, may be used to evaluate whether there is a need for heating of the EAT system 200. For example, such a sensor could be a NOx or soot sensor. Data from one or more sensors may be treated and/or assembled for determining said request. The request indicative of whether or not there is a need for heating the EAT system 200 may be transmitted using any suitable signal transmission means.

The request indicative of whether there is a need for heating the EAT system 200 or not may be based on a present situation. That is, for example the present information from various sensors is used to form the request.

Optionally, the request indicative of whether there is a need for heating the EAT system 200 or not may be based on an upcoming situation. In this case, the upcoming situation may be predicted using data as input, such as traffic situation data, geographic data, weather data and/or EATS status. Hence, present EATS information data, e.g. from sensors may be used to predict a future situation. For example, an upcoming situation involving a traffic jam in which the EAT system 200 generally risks cooling down may be predicted. To counteract the coming cooling of the EAT system 200, it may be desired to rise the temperature of the EAT system 200 before reaching the traffic jam situation. Hence, the braking strategy is applied for heating the EAT system 200 while braking (e.g. before reaching the traffic jam situation).

A next step S30 comprises determining that said request is indicative of that there is a need for heating the EAT system 200 and controlling the braking of the vehicle 1 until the speed reduction request and/or the request indicative of a need for heating the EAT system 200 is no longer applicable, in accordance with the following steps S40, S50, S60, S70.

The controlling of the braking of the vehicle 1 in the embodiment of FIG. 2 comprises a first step S40 of determining a present engine speed. A second step S50 comprises comparing the present engine speed with a current engine braking minimum limit speed. If the present engine speed is equal to or less than the current engine braking minimum speed, the next step S60 after said second step S50 comprises changing the gear ratio of the transmission 400 such that an increase of the present engine speed to a value greater than said engine braking minimum limit speed is obtained. If the present engine speed is greater than said engine braking minimum limit speed, the next step S70 after said second step S50 comprises engine braking so as to decrease the present engine speed. For the embodiment of FIG. 2, it will be understood that the step S60 of changing the gear ratio of the transmission 400 is such that an updated engine speed is obtained, whereby when the loop of the method turns again to steps S40 and S50 a determined present engine speed being above said current engine braking minimum limit speed is obtained. Accordingly, step S70: In response to the determined present engine speed (the updated speed) being above said current engine braking minimum limit speed: engine braking so as to decrease said present engine speed, will naturally follow.

However, other embodiments are conceivable wherein the steps S40 and S50 are omitted or are performed elsewhere in a logical schematic of the method. Accordingly, the loop structure of FIG. 2 may be omitted. However, the step S30 of controlling the braking of the vehicle always comprises the step S60: In response to a determined present engine speed being equal to or less than a current engine braking minimum limit speed: changing the gear ratio of said transmission such that an updated engine speed is obtained, whereby a determined present engine speed is above said current engine braking minimum limit speed, and the step S70: In response to the determined present engine speed being above said current engine braking minimum limit speed: engine braking so as to decrease said present engine speed. Hence, in practice, the step S70 will follow the step S60 also in other embodiments of the method.

As long as the speed reduction request and the request indicative of a need for heating the EAT system 200 are both applicable, the braking will be performed by engine braking, while it is ensured that the present engine speed limit is kept above the current engine braking minimum speed.

Accordingly, engine braking may take place during a prolonged period as compared to prior art methods, where engine braking was simply not allowed as soon as the present engine speed fell below an engine braking minimum speed. The engine braking in turn is effective to heat the EAT system 200.

Hence, the step S70 of engine braking when the present engine speed is greater than said engine braking minimum limit speed, may generally comprise engine braking so as to decrease the present engine speed until it reaches the current engine braking minimum limit at least once. This is particularly the case if current engine speed is greater than the engine braking minimum limit speed at the time of commencing the controlling of the braking of the vehicle.

The current engine braking minimum limit speed is a lower limit for when engine braking is generally allowed during driving of the vehicle, as explained in the above.

As also mentioned in the above, the engine braking may comprise exhaust braking and/or compression braking.

Before commencing the controlling of the braking of the vehicle, the method may optionally comprise a step of determining that the present engine speed is less than a predetermined limit speed. The predetermined limit speed may be set to an engine speed at which the control of the method may become relevant, i.e. indicating that the future current engine speed may risk coming close the engine braking minimum limit speed.

Figure 3:
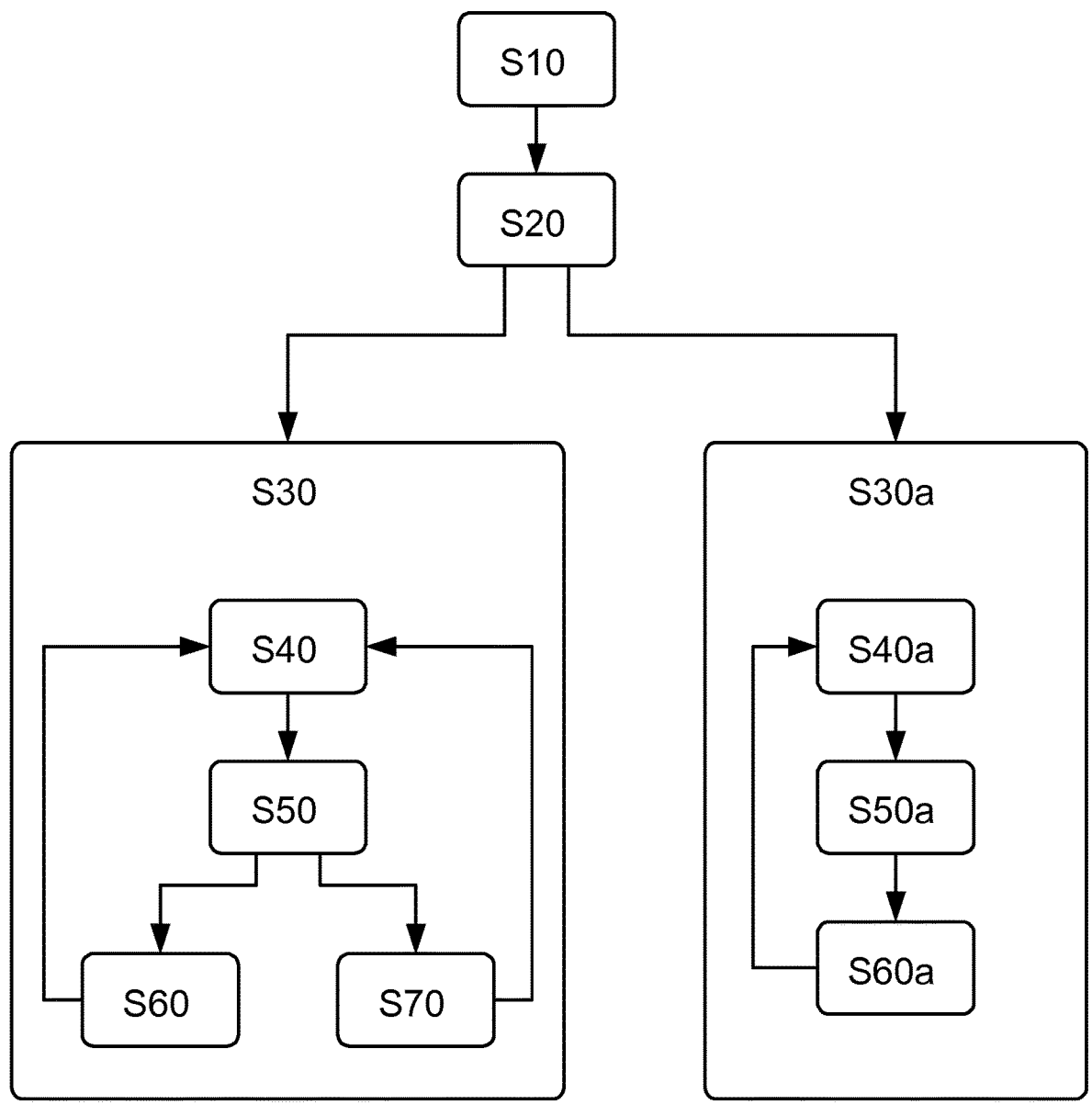
FIG. 3 is a flow-chart illustrating another embodiment of the method described herein.

FIG. 3 is a flow-cart of an embodiment of a method, wherein also the steps to perform when there is not a need for heating the EAT system is indicated.

A first step S10 of receiving a speed reduction request, and a second step S20 of receiving a request indicative of whether there is a need for heating said EAT system or not are performed as described in relation to FIG. 2 above. Also, the step S30 of determining that the request is indicative of that there is a need for heating the EAT system and controlling the braking of the vehicle until the speed reduction request and/or the request indicative of a need for heating the EAT system is no longer applicable is similar to that described in relation to FIG. 2 above, as are the following steps S50, S60 and S70 constituting the controlling of the braking of the vehicle.

However, in FIG. 3 it is also indicated a step S30*a* of determining that the request is indicative of that there is not a need for heating the EAT system. In this case, the method comprises controlling the braking of the vehicle until the speed reduction request is no longer applicable in accordance with at least the step S60*a* of decoupling the set of ground engaging members 300 from the diesel engine 10, and, optionally, braking the set of ground engaging members 300. In the method of FIG. 3, the method comprises a first step S40*a* of determining a present engine speed, a second step S50*a* of comparing the present engine speed with a current engine braking minimum limit speed, and in response to the present engine speed being equal to or less than the current engine braking minimum limit speed: performing the step S60*a* of decoupling the set of ground engaging members 300 from the diesel engine 100.

Simply put, when there is no need for heating the EAT system, the braking may be performed as is conventional, either by engine braking down to a current engine braking minimum limit, or by decoupling the engine 100 and braking e.g. using wheel brakes. If the present engine speed is less than a current engine braking minimum limit, engine braking is however not permitted.

Again, the steps S40*a* and S50*a* of FIG. 3 may in other embodiments be omitted or may be performed elsewhere in a logical method schedule. However, the step S30*a* will comprise the step S60*a* including the decoupling of the set of the ground engaging members.

Figure 4:
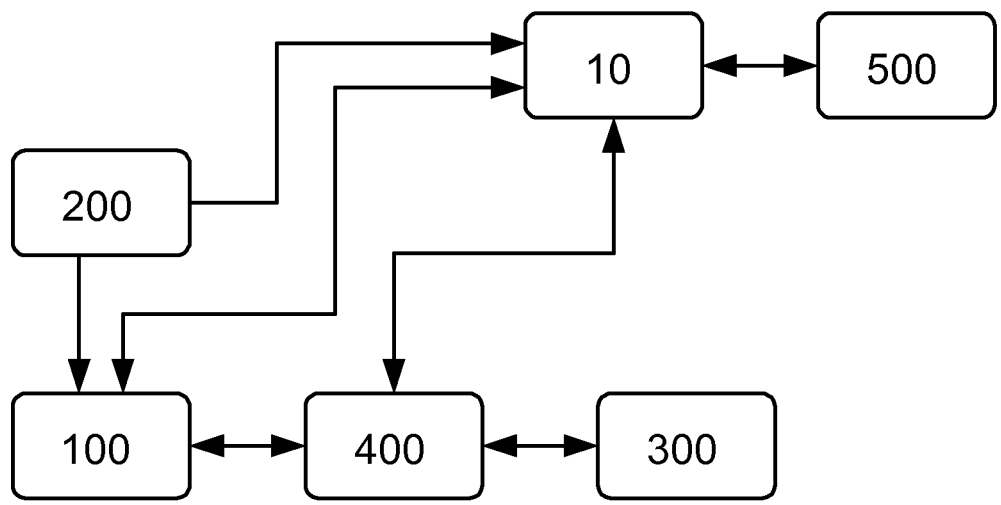
FIG. 4 is a schedule indicating the function of a control unit for implementing the method as described herein for a vehicle.

FIG. 4 is a schedule indicating the function of a control unit 10 for implementing the method as described herein for a vehicle. The control unit 10 is configured to perform the steps of a method as described herein. To this end, the control unit 10 may be arranged to receive information indicative of the status of an EATs system 200, to receive and submit information from/to a diesel engine 100, a transmission 400 between the diesel engine 100 and a set of ground engaging members 300. Also the control unit 10 may be arranged to communicate with a friction brake 500 for braking the set of ground engaging members 300.

The control unit 10 may comprise a suitable processor. Suitably, the control unit 10 is arranged on-board the vehicle 1.

Figure 5:
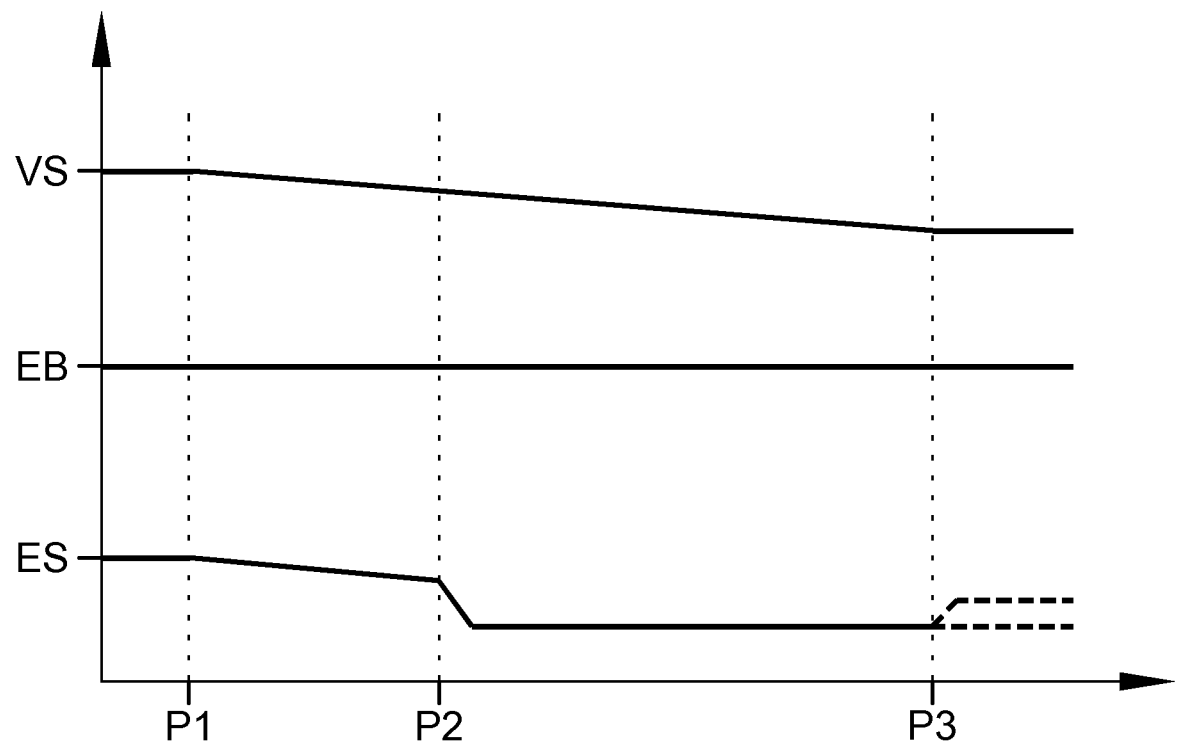
FIG. 5 is a diagram illustrating a prior art braking method.

FIG. 5 is a schematic illustration of a method of braking according to the prior art. It could also illustrate method steps used with the present invention, for the case when the request is indicative of that there is no need for heating of the EATS system.

The schematic illustration is a time line starting from the left. The uppermost line VS corresponds to the Vehicle Speed of the vehicle 1. As schematically illustrated in FIG. 5, the vehicle speed VS is initially constant. The braking method is activated at a first time P1. From this time P1 on, the vehicle speed VS decreases until it reaches a constant low speed or stop at a later time P3. At the time P1 of activation of the braking method, the accelerator pedal of the vehicle is released. At the time P3 of deactivating of the braking method, the accelerator pedal may be engaged if necessary to keep a constant speed, or else it may remain released.

In the embodiment of FIG. 5, the engine brake EB is not engaged. Instead, it is envisaged that direct braking is performed during the period between the activation time P1 and the deactivation time P3, so as to decrease the vehicle speed.

However, the engine speed ES may suitably be decelerated by changing the gear ratio of the transmission 400, e.g. to neutral, at an intermediary time P2 between the activation time P1 and the deactivation time P3 of the braking method. As seen in FIG. 5, this results in a decrease of the engine speed ES at the intermediary time P2.

Figure 6:
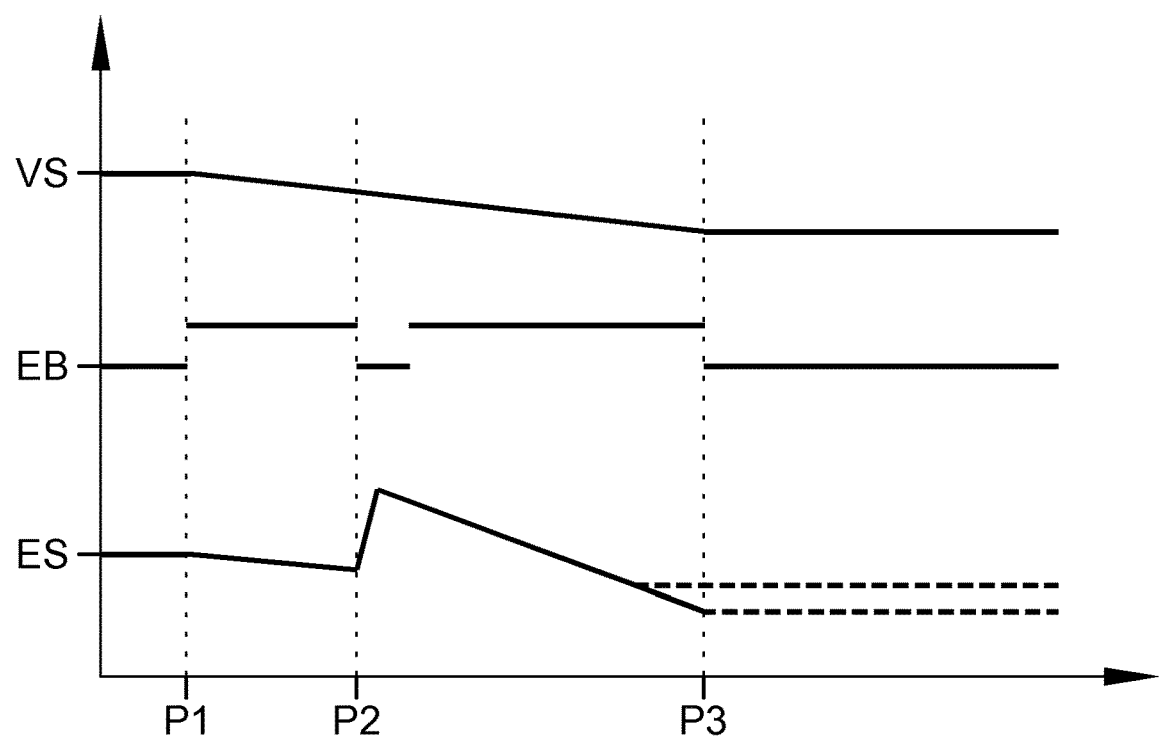
FIG. 6 is a diagram illustrating an embodiment of a method as described herein.

FIG. 6 illustrates schematically an embodiment of a method for controlling braking of a vehicle, for the case when a request indicative of a need for heating said EAT system is applicable.

As schematically illustrated in FIG. 6, the vehicle speed VS is initially constant. The braking method is activated at a first time P1. From this time P1 on, the vehicle speed VS decreases until it reaches a constant low speed or stop at a later time P3. At the time P1 of activation of the braking method, the accelerator pedal of the vehicle is released. At the time P3 of deactivating of the braking method, the accelerator pedal may be engaged if necessary to keep a constant speed, or else it may remain released.

In this example, the engine braking EB is initially not activated (low in FIG.). Upon activation of the braking method, at the activation time P1, the engine brake EB is activated (high in FIG.), resulting in the decrease of the vehicle speed VS. As seen in FIG. 6, the activation of the engine brake EB also results in a decrease of the engine speed ES. As the engine speed ES decreases, it eventually reaches a current engine braking minimum limit speed at a time P2. In accordance with the method as described above, this means that at the time P2, the gear ratio of the transmission 400 is changed such that the present engine speed is increased to a value above the current engine braking minimum limit speed. As seen in FIG. 6, in this embodiment the engine braking EB is temporarily released to enable the changing of gear ratio. After the change of gear ratio, engine braking EB is again applied, resulting in the engine speed decreasing, in this case until a time P3 at which the speed reduction request is no longer applicable. The vehicle speed VS is constant and the engine speed may either be a new engine speed suitable for the vehicle speed, or be idle speed, as indicated by the dashed lines in FIG. 6.

Hence, in the method of FIG. 6, the changing of gear ratio is selected such that only one change of gear ratio is performed during the course of the braking method. This may be preferred, meaning that any disadvantages due to the change of gear ratio, for example in comfort, occur only once.

Figure 7:
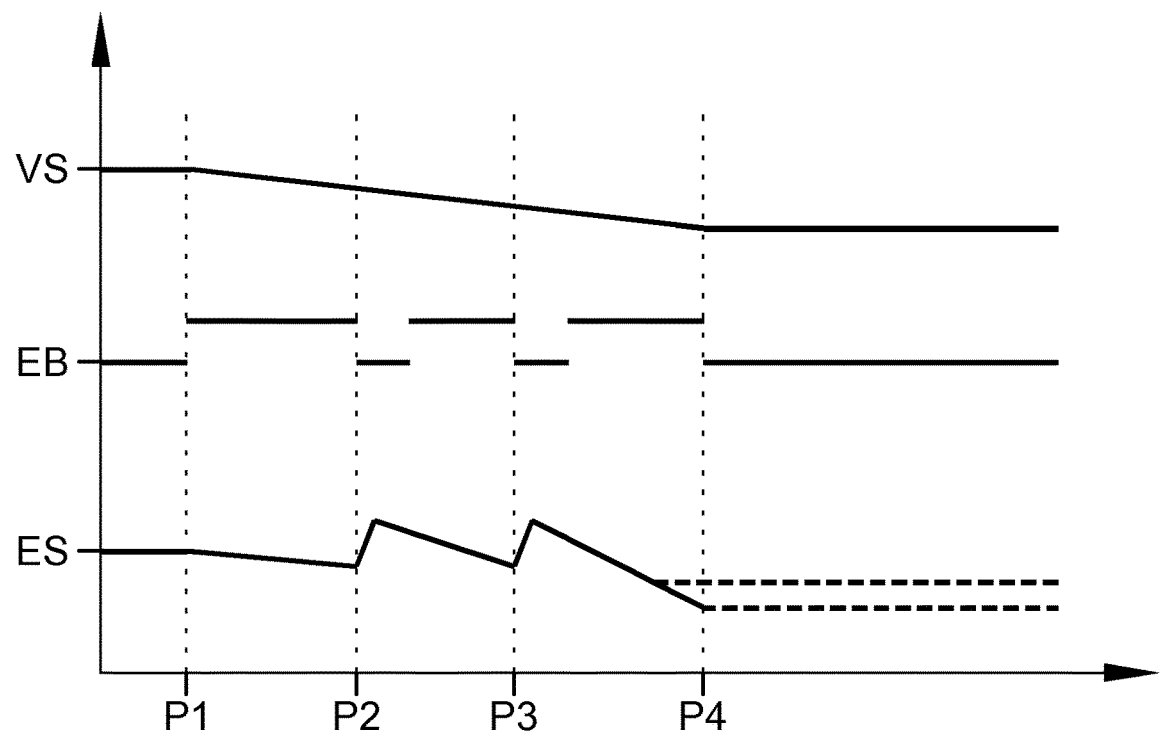
FIG. 7 is a diagram illustrating another embodiment of a method as described herein.

FIG. 7 illustrates schematically another embodiment of a method for controlling braking of a vehicle, for the case when a request indicative of a need for heating said EAT system is applicable.

Initially, the method is similar to the one described in relation to FIG. 6, involving a first change of gear ratio at a time P2. However, in this case, another change of gear ratio is performed at a new time P3.

Eventually, at a time P4 the speed reduction request is no longer applicable. The vehicle speed VS is thereafter constant and the engine speed may either be a new engine speed suitable for the vehicle speed, or be idle speed, as indicated by the dashed lines in FIG. 7.

Hence, in the method of FIG. 7 a plurality of changes of gear ratio is performed. This may be preferred, meaning that any disadvantages due to the change of gear ratio, for example in comfort, may be less pronounced due to the relatively limited range of each change of gear ratio.

As may be gleaned from FIG. 7, in the exemplified embodiment, the changing of gear ratio at the time P2 and the changing of gear ratio at the time P3 starts from slightly different engine speeds. Hence, in this example, the current engine braking minimum limit speed at the time P2 is different from the current engine braking minimum limit speed at the time P3. However, embodiments where the current engine braking minimum limit speed is constant are naturally also conceivable, as mentioned in the above.

It is to be understood that the present invention is not limited to the embodiments described above and illustrated in the drawings; rather, the skilled person will recognize that many changes and modifications may be made within the scope of the current disclosure.

The invention claimed is:

1. A method for controlling braking of a vehicle, comprising a diesel engine and an exhaust aftertreatment (EAT) system for treating exhaust from said diesel engine, a set of ground engaging members, and a transmission between said set of ground engaging members and said diesel engine, characterized by comprising the steps of: Receiving a speed reduction request; Receiving a request indicative of whether there is a need for heating said EAT system or not; Determining that said request is indicative of that there is a need for heating said EAT system and controlling said braking of said vehicle until said speed reduction request and/or said request indicative of a need for heating said EAT system is no longer applicable in accordance with the following: In response to a determined present engine speed being equal to or less than a current engine braking minimum limit speed: changing the gear ratio of said transmission such that an updated engine speed is obtained, whereby a determined present engine speed is above said current engine braking minimum limit speed, and In response to the determined present engine speed being above said current engine braking minimum limit speed: engine braking so as to decrease said present engine speed.

2. A method according to claim 1, Wherein said step of engine braking so as to decrease the present engine speed in response to the determined present engine speed being above said current engine braking minimum speed comprises engine braking until said present engine speed reaches said current engine braking minimum limit.

3. A method according to claim 1, wherein said request indicative of whether there is a need for heating said EAT system or not is based on a present situation.

4. A method according to claim 1, wherein said request indicative of whether there is a need for heating said EAT system or not is based on an upcoming situation.

5. A method according to claim 1, further comprising the step of: while performing said step of changing the gear ratio of said transmission, momentarily interrupting any engine braking.

6. A method according to claim 1, wherein, in said step of changing the gear ratio of said transmission, said gear ratio is selected in view of said speed reduction request and/or said heat request so that said step will be performed only once before the speed reduction request and/or the heat request is no longer applicable.

7. A method according to claim 1, wherein, in said step of changing the gear ratio of said transmission, said gear ratio is selected in view of said speed reduction request and/or said heat request so that said step will be performed more than once before the speed reduction request and/or heat request is no longer applicable.

8. A method according to claim 1, in said step of changing the gear ratio of said transmission, said gear ratio may be selected so as to perform an increase of the engine speed in the range of 800 to 1700 rpm.

9. A method according to claim 1, wherein said current engine braking minimum limit speed is a fixed value.

10. A method according to claim 1, wherein said current engine braking minimum limit speed is determined based on current engine braking conditions.

11. A method according to claim 1, wherein said engine braking comprises exhaust braking and/or compression braking.

12. Method according to claim 1, further comprising Determining that said request is indicative of that there is not a need for heating said EAT system, and controlling the braking of the vehicle until said speed reduction request is no longer applicable in accordance with a method comprising at least the step of: decoupling the set of ground engaging members from said diesel engine, and braking said set of ground engaging members.

13. Method according to claim 12, further comprising In response to a determined present engine speed being equal to or less than said current engine braking minimum limit speed: performing said step of decoupling said set of ground engaging members from said diesel engine.

14. A computer program comprising program code means for performing the steps of claim 1 when said program is run on a computer.

15. A computer readable medium carrying a computer program comprising program code means for performing the steps of claim 1, when said program product is run on a computer.

16. A control unit for controlling the braking of a vehicle, the control unit being configured to perform the steps of the method according to claim 1.

17. A vehicle comprising a control unit according to claim 16.

18. A method according to claim 4, wherein said upcoming situation is predicted using environmental data, such as traffic situation data, geographic data, weather data and/or EATS status.

* * * * *